United States Patent Office 3,699,000
Patented Oct. 17, 1972

3,699,000
DIAZOTYPE PHOTOPRINTING MATERIAL
Shoji Maruyama, Sagamihara-shi, Tadashi Saito, Kawasaki-shi, and Shigeaki Yoshida and Masaru Shimada, Yokohama-shi, Japan, assignors to Kabushiki Kaisha Ricoh, Tokyo, Japan
No Drawing. Filed May 15, 1969, Ser. No. 821,968
Claims priority, application Japan, May 15, 1968, 43/32,228
Int. Cl. G03c 1/58
U.S. Cl. 96—91          1 Claim

ABSTRACT OF THE DISCLOSURE

Diazotype photoprinting material containing as a coupling component a compound of a general formula:

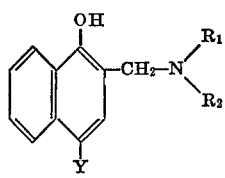

said photoprinting material giving a dense dye-image and having high preservability and being capable of using in both dry and wet development and not giving change of color of the substrate of the printed material.

BACKGROUND OF THE INVENTION

(A) Field of the invention

The present invention relates to diazotype photoprinting material containing as a coupling component a compound of a general formula:

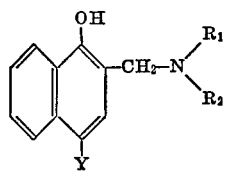

wherein $R_1$ and $R_2$ are hydrogen, alkyl radical of from 1 to 5 carbon atoms or phenyl radical, or they may be linked together with carbon, oxygen sulfur or nitrogen atom to form 5- or 6- members (atoms) ring, and Y is hydroxyl group or alkyl- or alkoxy-radical of from 1 to 6 carbon atoms.

(B) Description of the prior art

Though derivatives of 1-hydroxy-(4-hydroxy, alkyl or alkoxy)-naphthalene, which are used as coupling component, give a good dark blue dye-image when coupled with suitable diazo-compounds, they have disadvantages that their solubility in water is very low and hydroxyl group in 1-position is so easily oxidized by effect of hydroxyl group, alkyl- or alkoxy-radical (i.e. electron donor group) in 4-position that the photoprinting material containing such a coupling component will be soon contaminated by the oxidized coupling component. Consequently, said photoprinting material cannot give a good print when developed and the substrate of the printed material will give change of color. Further, because of low solubility of the coupling component, the production of the photoprinting material is difficult.

It is, therefore, an object of the present invention to provide photoprinting material of the good quality, containing an improved coupling component.

SUMMARY OF THE INVENTION

The present invention relates to diazotype photoprinting material containing as a coupling component a compound of a general formula:

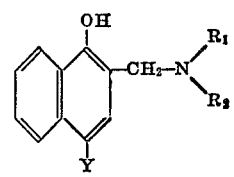

wherein $R_1$ and $R_2$ are hydrogen, alkyl radical of from 1 to 5 carbon atoms or phenyl radical, or they may be linked together with carbon, oxygen, sulfur or nitrogen atoms to form 5- or 6-members (atoms) ring, and Y is hydroxyl group or alkyl- or alkoxy-radical of from 1 to 6 carbon atoms. This coupling component gives a good dark blue dye-image when coupled with a suitable diazo-compound, and has high solubility in water and high antioxidation property. Consequently, this invention provides advantageously photoprinting material which gives a dense dye-image without contamination of a substrate (e.g. paper) of the photoprinting material after developing and has high preservability. Moreover, this photoprinting material may be used both in dry and wet development, namely, in an ammonia vapor and an alkaline aqueous solution.

The coupling components having the aforesaid general formula include following compounds, and among of them, the compounds having dialkylaminomethyl radical are preferred.

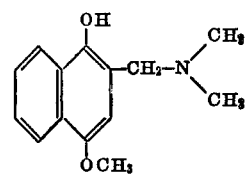

M.P. 84–85° C.

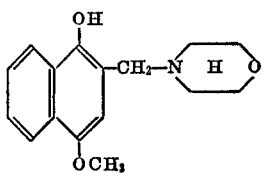

M.P. 95–96° C.

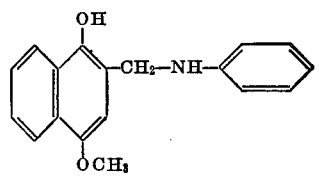

M.P. 111–112° C.

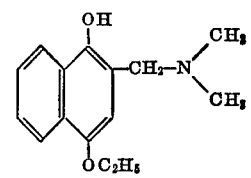

M.P. 80–81° C.

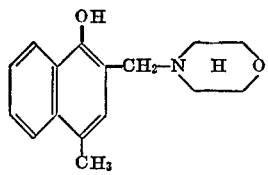

M.P. 77–78° C.

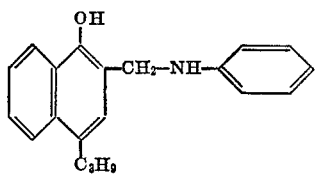

M.P. 115–157° C.

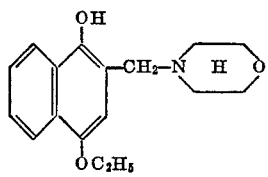

M.P. 125–126° C.

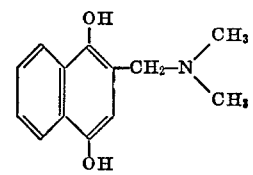

M.P. 89–90° C.

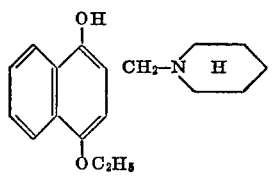

M.P. 109–110° C.

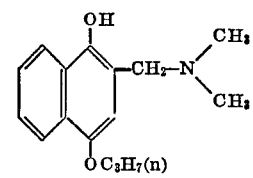

M.P. 89–90° C.

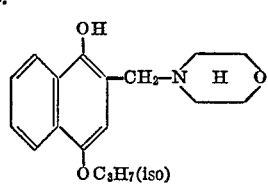

M.P. 134–135° C.

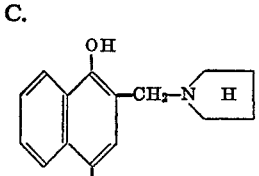

M.P. 91.5–92.5° C.

As the coupling components which are used in this invention are capable of forming water-soluble salts with inorganic or organic acids, solubilizer is not required for preparation of a photosensitive solution.

The coupling components which are used in this invention may be prepared as follows:

N,N,N',N'-tetramethyldiaminomethane, 7.5 g. (0.075 mol), are added in the solution of 9.4 g. (0.06 mol) of 1-hydroxy-4-ethoxynaphthalene in 100 cc. of methyl alcohol and this mixture is heated at a temperature of 50–60° C. for one hour. After cooling, white crystal is separated, and 9.8 g. of pure 1-hydroxy-2-N-dimethylaminomethyl-4-ethoxynaphthalene (M.P. 80–81° C.) are obtained by recrystallization of said white crystal from methyl alcohol. Yield 80%.

In this invention, diazo-compounds having a general Formulas 1, 2 and 3 may be suitably used:

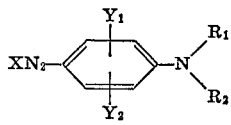

(1)

wherein $R_1$ and $R_2$ are hydrogen or hydroxylated alkyl radical of from 1 to 6 carbon atoms, or they may be linked together to form 5- or 6-members ring, X is acid radical, $Y_1$ and $Y_2$ are hydrogen or lower alkoxy radical, and when both $Y_1$ and $Y_2$ are alkoxy radicals, they are located in para-position.

Diazo-compounds of the general Formula 1 include, for example, salts of 1-diazo-4-diethylaminobenzene, 1-diazo-2-ethoxy-4-diethylaminobenzene, 1-diazo-4-hydroxyethylethylaminobenzene, 1-diazo-2,5-dimethoxy-4-morpholinobenzene and 1-diazo-2,5-diethoxy-4-morpholinobenzene.

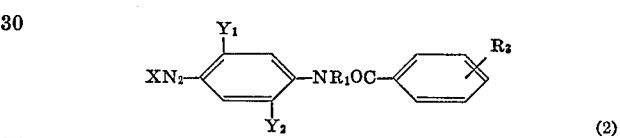

(2)

wherein X is acid radical, $Y_1$ and $Y_2$ are alkoxy radical of from 1 to 6 carbon atoms, $R_1$ is hydrogen or alkyl radical of from 1 to 6 carbon atoms, and $R_3$ is alkoxy or alkyl radical of from 1 to 6 carbon atoms.

Diazo-compound of the general Formula 2 is, for example, salt of 1-diazo-2,5-diethoxy-4-(4'-methoxy)-benzoylaminobenzene.

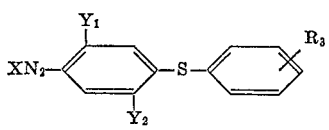

(3)

wherein X is acid radical, $Y_1$ and $Y_2$ are alkoxy radical of from 1 to 6 carbon atoms, and $R_3$ is hydrogen, or alkyl- or alkoxy-radical of from 1 to 6 carbon atoms.

Diazo-compound of the general Formula 3 is, for example, salt of 1-diazo-2,5-dimethoxy-4-(4'-methyl)-thiophenylbenzene.

The coupling components which are used in this invention may react with the other diazo-compounds and, among them, they react with diazo-compounds (having tertiary nitrogen atom) derived from diazotised p-phenylenediamine to give a dense dye-image and they react with the diazo-compounds having alkoxy radical such as methoxy, ethoxy or butoxy radical in para-position of benzene nucleus having diazo group to give a stable and dense dye-image.

It is understood that the diazotype photoprinting material of this invention is obtained by coating a photosensitive solution containing the aforesaid coupling component and diazo compound on a surface of the substrate (e.g. paper) and drying it. The photosensitive solution may contain preferably stabilizer such as inorganic acids e.g. hydrochloric acid or boric acid, organic acids e.g. tartaric acid, citric acid or 1,3,6-naphthalenetrisulfonic acid or inorganic salts e.g. zinc chloride or aluminium sulfate and, if necessary, organic solubilizer (or developing accelerator) such as urea, thiourea, ethyleneglycol or methylethylglycol.

DESCRIPTION OF THE PREFERRED EMBODIMENTS

The present invention is further illustrated by the following non-limitative examples.

EXAMPLE 1

A photosensitive solution was prepared from following ingredients:

| | | |
|---|---|---|
| Citric acid | g | 4.0 |
| Thiourea | g | 4.0 |
| Conc. $H_2SO_4$ | cc | 0.5 |
| 1 - hydroxy - 2 - dimethylaminomethyl - 4 - methoxynaphthalene | g | 1.5 |
| 1 - diazo - 2,5 - dibutoxy - 4 - morpholinobenzene chloride ½$ZnCl_2$ | g | 0.6 |
| Water | cc | 100 |

A diazotype photoprinting material made of said photosensitive solution, gave a dark royal purple dye-image by overlaying it on the desired-image-carrying-original, exposing it to luminescent lamp and developing it in an ammonia vapor or an alkaline aqueous solution. The substrate of this printed material did not give change of color after exposure to the indoor light for 30 days.

EXAMPLE 2

A photosensitive solution was prepared from the following ingredients:

| | | |
|---|---|---|
| Tartaric acid | g | 5.1 |
| Boric acid | g | 4.0 |
| Thiourea | g | 4.0 |
| 1 - hydroxy - 2 - pyrrolidinomethyl - 4 - ethoxynaphthalene | g | 2.0 |
| 1 - diazo - 2,5 - dimethoxy - 4 - morpholinobenzene chloride ½$ZnCl_2$ | g | 0.6 |
| Water | cc | 100 |

A photoprinting material made of said photosensitive solution, gave a dense blue dye-image by treating it in the same manner as that in Example 1 and the substrate of this printed material did not give change of color after exposure to the indoor light for 30 days.

EXAMPLE 3

A photosensitive solution was prepared from following ingredients:

| | | |
|---|---|---|
| Citric acid | g | 5.0 |
| Boric acid | g | 2.0 |
| Zinc chloride | g | 1.0 |
| Thiourea | g | 4.0 |
| 1 - hydroxy - 2 - morpholinomethyl - 4 - isopropoxynaphthalene | g | 2.0 |
| 1-diazo-4-morpholinobenzene chloride ½$ZnCl_2$ | g | 0.5 |
| Water | cc | 100 |

A photoprinting material made of said photosensitive solution possessed the properties similar to that described in Example 1.

EXAMPLE 4

A photosensiitve solution was prepared from following ingredients:

| | | |
|---|---|---|
| Citric acid | g | 5.0 |
| Conc. HCl | cc | 1.0 |
| Zinc chloride | g | 2.0 |
| Thiourea | g | 1.0 |
| 1,4 - dihydroxy - 2 - dimethylaminomethylnaphthalene | g | 2.5 |
| 1 - diazo - 2 - ethoxy - 4 - diethylaminobenzene chloride ½$ZnCl_2$ | g | 1.0 |
| Water | cc | 100 |

A photoprinting material made of said photosensitive solution possessed the properties similar to that described in Example 2.

EXAMPLE 5

A photosensitive solution was prepared from following ingredients:

| | | |
|---|---|---|
| Citric acid | g | 0.5 |
| Conc. $H_2SO_4$ | cc | 0.5 |
| Caffeine | g | 1.0 |
| Sodium 1,3,6-naphthalenetrisulfonate | g | 0.5 |
| 1 - hydroxy-2-dimethylaminomethyl-4-methoxynaphthalene | g | 0.5 |
| 1 - diazo-4-(4'-methoxy)-benzoilamino-2,5-diethoxybenzene chloride ½$ZnCl_2$ | g | 2.0 |
| Saponin | g | 0.1 |
| Methylene Blue | g | 0.05 |
| Water | cc | 100 |

A photoprinting material made of said photosensitive solution gave a royal purple dye-image having good contrast by developing it in an alkaline aqueous solution containing 20 g. of potassium carbonate and 30 g. of potassium metaborate in 1,000 cc. of water and the substrate of this printed material did not give change of color after exposure to the indoor light for 30 days.

We claim:

1. A diazotype photoprinting material comprising a support having a coating thereon, said coating comprising (a) as a coupling component, the compound having the formula

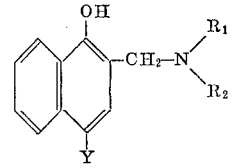

wherein $R_1$ and $R_2$ are each hydrogen, alkyl of from 1 to 5 carbon atoms, phenyl or $R_1$ and $R_2$ taken together with the nitrogen atom, form a 5 or 6 membered saturated heterocyclic ring, said ring containing carbon, oxygen, sulphur, and nitrogen atoms and Y is hydroxy, and (b) a diazonium compound, (c) an acidic stabilizer.

References Cited

UNITED STATES PATENTS

| | | | |
|---|---|---|---|
| 2,150,565 | 3/1939 | Schmidt et al. | 96—91 X |
| 2,298,444 | 10/1942 | Weissberger et al. | 96—91 |
| 2,516,931 | 8/1950 | Von Glahn et al. | 96—91 |
| 2,617,726 | 11/1952 | Kessels | 96—91 X |
| 2,694,010 | 11/1954 | Botkin et al. | 96—91 |
| 3,139,341 | 6/1964 | Schlesinger | 96—91 |
| 3,255,010 | 6/1966 | Sus et al. | 96—91 X |
| 3,343,960 | 9/1967 | Sus | 96—91 |
| 3,493,378 | 2/1970 | Sus | 96—91 |

FOREIGN PATENTS

| | | | |
|---|---|---|---|
| 491,095 | 8/1938 | Great Britain | 96—91 |
| 554,921 | 7/1943 | Great Britain | 96—91 |
| 819,627 | 10/1937 | France | 96—91 |

CHARLES L. BOWERS, JR., Primary Examiner

U.S. Cl. X.R.

96—49; 260—141, 247.7, 294.7 B, 326.5 M, 570.9